United States Patent [19]

Carley

[11] 4,220,497
[45] Sep. 2, 1980

[54] HIGH STRENGTH COMPOSITE OF RESIN, HELICALLY WOUND FIBERS AND SWIRLED CONTINUOUS FIBERS AND METHOD OF ITS FORMATION

[75] Inventor: Earl P. Carley, Upper Burrell, Pa.

[73] Assignee: PPG Industries, Inc., Pittsburgh, Pa.

[21] Appl. No.: 8,367

[22] Filed: Feb. 1, 1979

[51] Int. Cl.³ .................. B32B 5/02; B65H 81/00
[52] U.S. Cl. .................. 156/174; 156/180; 156/245; 428/288; 428/377
[58] Field of Search .................. 428/367, 377, 371; 156/169, 172, 173, 175, 168, 180, 242, 245, 174

[56] References Cited

U.S. PATENT DOCUMENTS

| | | | |
|---|---|---|---|
| 2,751,962 | 6/1956 | Drummond | 65/3 |
| 3,044,146 | 7/1962 | Thomas et al. | 428/357 X |
| 3,156,598 | 11/1964 | Martin | 156/161 |
| 3,379,591 | 4/1968 | Bradley | 156/425 X |
| 3,382,123 | 5/1968 | Alexander | 156/174 X |
| 3,492,187 | 1/1970 | Hirtzer | 156/429 |
| 3,567,542 | 3/1971 | Jackson | 156/173 X |
| 3,568,286 | 3/1971 | Ross | 156/169 X |
| 3,669,638 | 6/1972 | Wong et al. | 65/3 |
| 3,692,601 | 9/1972 | Goldsworthy et al. | 156/169 X |
| 3,788,918 | 1/1974 | Poulsen | 156/173 X |
| 3,791,900 | 2/1974 | Goerden et al. | 156/173 X |
| 3,840,618 | 10/1974 | DaFano | 260/863 |
| 3,869,339 | 3/1975 | Dhingra | 156/174 X |
| 3,873,291 | 3/1975 | Miller | 428/288 |
| 3,922,426 | 11/1975 | Feltzin | 428/295 |
| 3,956,564 | 5/1976 | Hillig | 428/364 X |
| 3,984,271 | 10/1976 | Gilbu | 156/174 |
| 4,012,266 | 3/1977 | Magee et al. | 156/173 |
| 4,065,597 | 12/1977 | Gillespie | 428/285 |
| 4,077,828 | 3/1978 | Strom | 156/172 X |
| 4,135,035 | 1/1979 | Branen | 428/364 |
| 4,141,929 | 2/1979 | Stoops | 260/862 |
| 4,167,429 | 9/1979 | Ackley | 156/174 |

FOREIGN PATENT DOCUMENTS 1110572 4/1968 United Kingdom .
1353984 5/1974 United Kingdom .
1382162 1/1975 United Kingdom .
1439562 6/1976 United Kingdom .

OTHER PUBLICATIONS

Ackley, Richard H. *XMC TM and HMC TM Structural Molding Compounds*, Society of Automotive Engineers, Feb. 1976.
Ackley, Richard H. *XMC TM Structural FGRP for Match-Metal Die Molding*, 31st Annual Technical Conference, 1976 Reinforced Plastics/Composites Institute, The Society of the Plastic Industry, Inc.
Ives, Frank et al. *Chop-Hoop Filament Winding*, 31st Annual Technical Conference, 1976, Reinforced Plastics/Composites Institute, The Society of the Plastic Industry, Inc.

*Primary Examiner*—Lorraine Y. Kendell
*Attorney, Agent, or Firm*—John E. Curley; Paul A. Leipold

[57] ABSTRACT

A fiber reinforced resin composite and its formation method is disclosed. The process comprises applying resin in a metered amount to fiber strands, winding the coated strands onto a drum while simultaneously applying swirled continuous fibers to the area immediately to be covered by the strands as they are wound. The preferred material for both the wound strands and the swirled strand is fiber glass.

7 Claims, 2 Drawing Figures

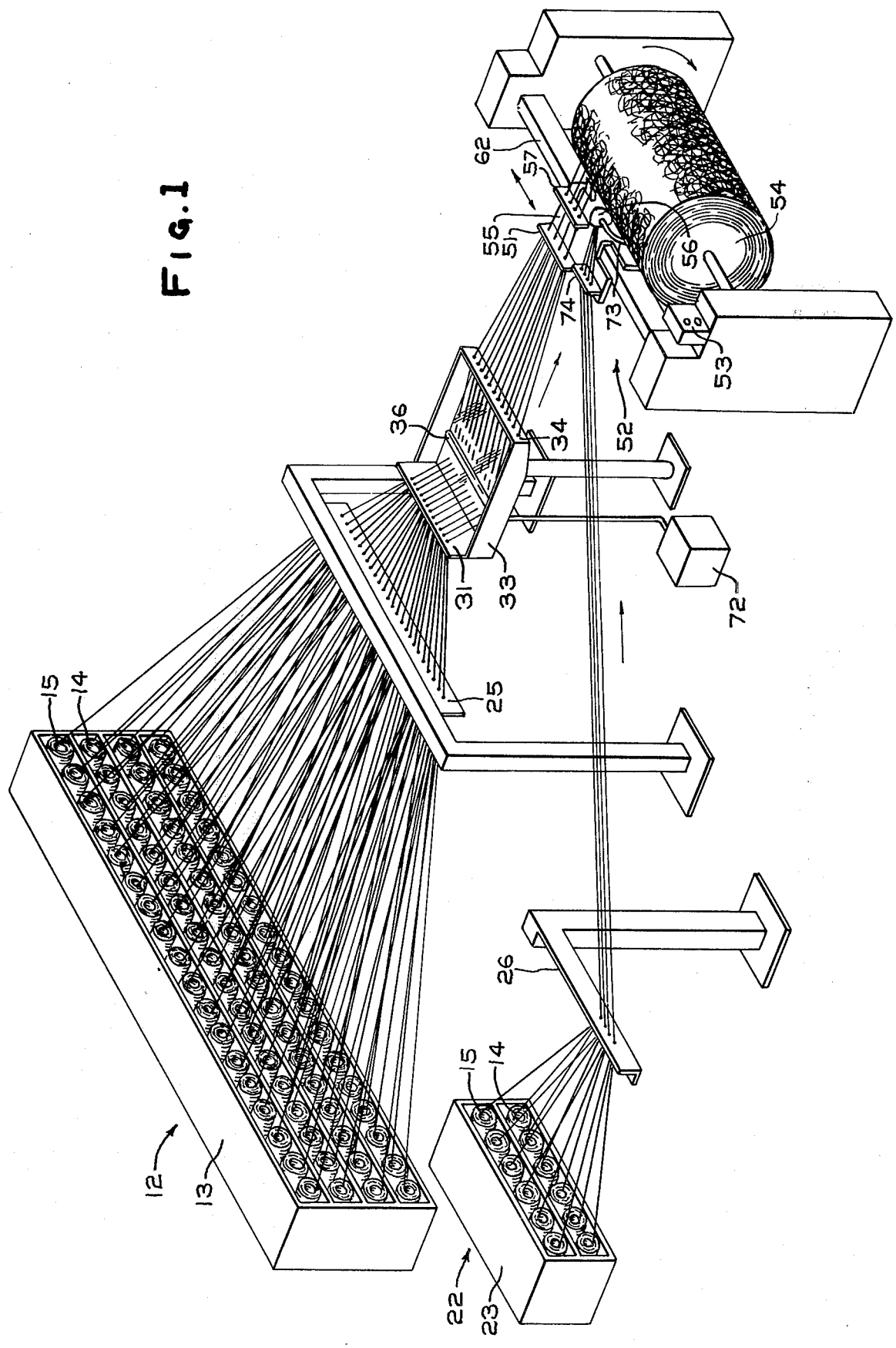

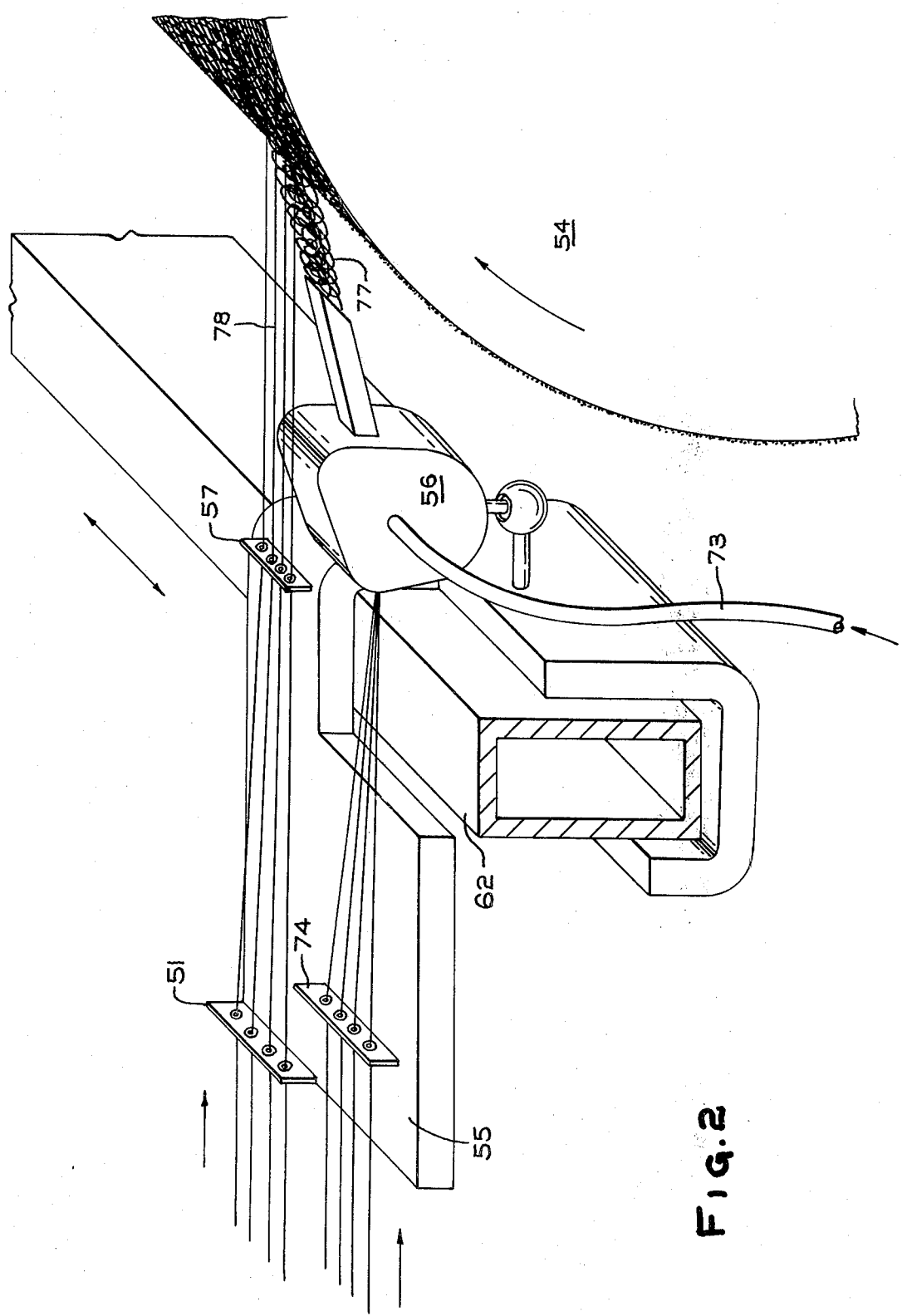

HIGH STRENGTH COMPOSITE OF RESIN, HELICALLY WOUND FIBERS AND SWIRLED CONTINUOUS FIBERS AND METHOD OF ITS FORMATION

BACKGROUND OF THE INVENTION

1. Field of the Invention

This invention relates to fiber reinforced resin articles. In particular the invention relates to methods of forming resin reinforced helically wound composites.

2. Prior Art

The concept of reinforcing resin articles with fibrous material such as fiber glass is well known. The methods of reinforcing resin have ranged from the addition of short pieces of fiber of about ⅛ inch to injection molding compositions to the utilization of woven mats of fiber in combination with resin to form laminates. Other composites have been formed by winding resin impregnated fibers onto a mandrel. The following references illustrate processes of reinforcing resins with fibers and are considered pertinent to the instant invention.

U.S. Pat. No. 3,669,638 to Wong et al. discloses a process wherein randomly oriented glass fiber mats are formed from glass fibers which have been chopped and combined with a binder, preferably by spraying the binder onto the falling fibers. Wong et al. also discloses wherein continuous fibers are layed on a forming belt and utilized to form mats. These continuous fibers may be either sprayed with the resin after being placed on the mat or sprayed prior to being placed on the mat. FIGS. 6 and 7 illustrate embodiments wherein continuous strands are utilized.

U.S. Pat. No. 3,873,291 to Miller illustrates a method wherein glass filaments are continually wound onto a rotating drum and sprayed with a binder solution after being wound on the drum to form glass fiber mats.

U.S. Pat. No. 3,044,146 to Thomas et al. discloses combinations of swirled single fiber or laterally extending continuous fibers combined with short chopped lengths of fiber and resin to form composite moldable articles.

An article by Frank Ives and Louis A. Bacon titled "Chop-Hoop Filament Winding" from the 31st Annual Technical Conference, 1976 Reinforced Plastics/Composites Institute The Society of the Plastics Industry, Inc. Section 23-A, pages 1 through 4 discloses a method which is a combination of hoop winding and chopped strands gunning. In the method therein disclosed hoop winding of strands is carried out with gunning of chopped strand and resin onto the drum surface immediately prior to the covering of an area with the hoop strand.

All the above systems produced useful products. There remain difficulties in the formation of high strength materials. With the above formation methods it is difficult to achieve good bonding of the fibers especially glass fibers with the resin at high concentrations of glass fibers. At high concentrations of glass fibers without good wetting delamination defects cause low strength products to result. A further difficulty with the above products is that the strength of the material is not consistent due to irregular coating of the resin and irregular presence of the resin in some areas of the product. The method of applying resin to chopped fiber in a gun produces an inconsistent coating as the gun tends to apply globs of resin and fibers rather than a continuous coat. Another difficulty with the chop-hoop method is that the entire resin amount must be added with the chopped fibers and therefore adequate wetting of the wound strands does not take place. Therefore there remains a need for a high strength, high quality fiber reinforced resin composite, with improved transverse physical properties that is moldable in heated press molds.

A process has been proposed in copending application Ser. No. 8,365 filed Feb. 1, 1979 titled "High Strength Composite of Resin, Helically wound Fibers and Chopped Fibers and Method of its Formation" inventors E. P. Carley and R. H. Ackley for formation of a composite of helically wound resin coated fibers in combination with chopped fibers. This produces an excellent product. However, there is still a need for a product that has better penetration and delamination resistance for use in areas of high impact such as loading platforms and truck beds. Further, the chop process results in some loss of fibers as some chopped fibers are lost as they do not stick on the mandrel and fall to the floor.

SUMMARY OF THE INVENTION

It is an object of this invention to overcome disadvantages of prior processes.

It is another object to form high strength resin-fiber composite articles.

It is a further object to produce moldable high strength glass fiber reinforced composites that have improved strength in the transverse direction.

It is another object to produce a resin-glass strand composite that does not warp.

It is again a further object to produce resin-fiber composites with low waste of fiber and resin.

It is an additional object to produce resin fiber composites of high fiber content.

It is another further object to produce a composite with very good resistance to impact.

It is another object of this invention to form composite high strength articles without waste.

It is again another object of this invention to produce resin-fiber composites of uniform properties.

It is an additional further object to produce high strength resin-fiber composites that have high resistance to delamination caused by impact.

These and other objects of the invention are accomplished generally by winding resin wetted strands of fiber glass in a helical pattern onto a drum while applying dry swirled strands of fiber to that area of the drum where they are immediately covered by the winding of the strands in the helical pattern.

In a best mode of the invention the fibers are glass strands from forming packages that are utilized in an amount such that the composite formed has a content of about 50 parts by weight wound strands, about 25 parts by weight swirled fiber glass strands and about 25 parts by weight resin matrix. The resin is applied in a carefully metered amount by passing the strands of glass through a bath and then through a close tolerance orifice that controls resin content prior to application to the drum in the helical winding. It is further preferred for the strongest composite to have a helix winding angle of between about 82° degrees and 87.5° degrees.

BRIEF DESCRIPTION OF THE DRAWINGS

FIG. 1 is a somewhat schematic view in perspective of the apparatus for carrying out the process of the invention.

FIG. 2 is a fragmentary perspective view of the apparatus showing laydown of the continuous fiber and the relationship of the swirl applicator and strand winder.

DETAILED DESCRIPTION OF THE PREFERRED EMBODIMENTS

The invention will now be described generally with reference to the processes illustrated in FIG. 1.

A creel 12 containing forming packages 14 is arranged such that the threads from the fiber glass forming packages may be withdrawn by means of eyelets 15 for feeding to the process. A ceramic eyelet is utilized for feeding each forming package from the creel. The strand end from the forming packages 14 are fed through the knock out board 25 which further feeds the single package strands without twisting and with minimum abrasion to the strands. The strands are led from the knock out board 25 into the strand grouping guide bar 31, and then into the bath generally indicated by 32. The bath is formed of a container 33 having inlet ceramic guides 35 in guide bar 31. The strands after entering the bath through the ceramic guides 35 are drawn under the surface of the resin bath and kept submerged during passage through the bath by rods such as 36. The exit orifices 34 from the bath are regulated to close tolerances to meter a measured predetermined amount of resin onto each of the gathered strands. The use of forming package strands that have not been joined prior to entry in the bath allows better wetting while the close tolerances of the exit orifices insure a carefully metered amount of resin being adhered to the strands. The level of resin in the bath is controlled by a level regulating means not shown which regulates the addition of the bath components from the source of resin generally indicated as 72. After leaving the bath 32 the strands now coated with uncured resin are led to the winder generally indicator by 52. The strands are led to the traversing carriage 55 on which is mounted a strand guide plate 51 and a spacer bar 57 having eyelets with predetermined spacing and diameter. The eyelet's diameter and spacing on the spacer bar 57 of traversing carriage 55 are important to insure that the strands are not abraded by the eyelets and that the strands are at the proper spacing such that the helical winder will lay or rest strands of successive layers precisely in the spaces between the strands of those layers previously wound. The rotational speed of the drum 54 is controlled by selection at the winder control 53. Changing of the machine settings allows various helix angle variations.

Strands for the swirled fibers are led from the source generally indicated at 22 comprising creel 23 having the forming packages 14 led through eyelets 15. From the creel the strands are led through ceramic guides in knock out board 26 then through guide 74 to the swirled strand applicator 56 where they are applied to the mandrel immediately before the resin impregnated continuous strands contact the continuous winding mandrel. The swirled strands are applied by conventional air motor chopper gun 56 that has the cutting blades removed. The strands are applied at a rate that causes them to lie on the mandrel in swirls 77 as they are overfed at a rate greater than the peripheral speed of the drum. The gun is mounted on the lower portion of traversing carriage 55 such that is can project the swirled strand 77 under the collimated continuous strands 78. The air hose 73 supplies air to drive the gun. While the apparatus illustrated utilizes a traversing carriage and rotating mandrel for the helical winding it is also within the invention to utilize a mandrel that both rotates and moves along its axis while winding from a stationary source of strands.

The composites of swirled fibers and helically wound fibers result in a composite molding sheet which is suitable for processing into structural shapes through the use of heated matched-metal-molds and hydraulic presses. The swirled strand helically wound composite also could be utilized with winding around an inflatable core and curing on the core member to directly create a shaped article. The need to remove weight from power driven vehicles has increased and consequently the need for high strength, high density materials to replace metals in structural parts for the transportation industry has also increased. The composite of the instant invention provides the high strength, moldability and weight reduction not found in other articles.

In discussion of the process and product of the instant invention, it is helpful that certain terms are defined. The following definitions will be used in this specification.

Mandrel: The form around which the winding is accomplished.

Band or Ribbon: A term applied to the collimated strands as they are wound onto the mandrel.

Band or Ribbon Width: The width of the band measured perpendicular to the band direction.

Circuit: One complete cycle of carriage motion.

Pattern: A complete pattern is formed when a band of fibers lies adjacent to a perviously wound band. If the bands become adjacent after one cycle of the carriage, there is one circuit per pattern. If two cycles of the carriage are necessary before the band lies adjacent to a band previously wound, then there are two circuits per pattern, and so on. T:C is the ratio of "mandrel revolutions to complete a pattern" to "traversing circuits to complete a pattern."

Layer: A covering of the mandrel in both traversing directions by the ribbon or band. In the case of a solid ribbon, a layer would completely cover the mandrel; while in the case of an open ribbon with spacing between the strands, a layer would not completely cover the mandrel as open diamonds would be present.

Ply: A complete covering of the mandrel with no open diamonds. In the case of a solid ribbon or band, a layer would equal a ply. An open ribbon requires more than one layer to obtain a ply, and the number of layers required depends on the spacing between the strands and the strand width.

Crossovers: Crossovers cause an interweaving of the fiber glass strands as they are wound onto the revolving mandrel; interweaving is increased with an increased number of crossovers. Crossovers can be achieved by winding a ribbon having spacing between the collimated fiber glass strands. Crossovers of solid ribbons are achieved by increasing the number of circuits required to complete a pattern, that is, by increasing C in the T:C ratio.

Helix Angle: α—The included acute angle created by the intersection of the band on the body of the mandrel with a line on the body of the mandrel parallel to the longitudinal axis of the mandrel.

Winding Angle: $\beta$—The included acute angle created by the intersection of the band on the body of the mandrel with a line on the body of the mandrel perpendicular to the longitudinal axis of the mandrel.

The instant invention allows utilization of a variety of resins and fibers to achieve differing product properties. Among the variables which influence the process and composite of the instant invention are the fiber content of the composite, the helix angle, winding angle, the ratio of continuous strand to swirled strand to resin, the resin composition and the spacing between strands.

Any fiber may be used in the instant invention which results in a composite of high strength and possesses the integrity necessary for the winding process. Typical of fiber utilized in the invention are polyimide, polyester fibers, polyamide fibers, natural fibers and metal fibers. Suitable for the invention are polyaramid fibers (KEVLAR ® DUPONT). Preferred fibers for the instant invention are glass fiber strands and carbon strands as these materials result in high strength properties and are suitable for swirling or winding on the mandrel of the invention to form resin fiber composites. An optimum material has been found to be glass fibers from forming packages as such fibers possess superior wetting properties, do not filamentize readily and provide good bonding with the resin.

The resin utilized in the instant process and composite may be any material that provides the necessary bonding and strength for the composite article formed. Among typical resins are polyolefins, polyaramids, novalacs and polystyrenes. Suitable resins for the instant process are vinyl esters epoxy resins, polyurethanes and polyesters. Typical of heat curing polyester resins that may be employed in the invention are those disclosed in U.S. Pat. Nos. 3,772,241 to Kroekel; 3,701,748 to Kroekel and U.S. Pat. No. 3,840,618 to DaFano. Preferred resin materials are thermally cured polyester resins as these materials provide a high strength composite and give reasonable shelf life to the composite prior to their curing during the heat and pressure formation of the composite. When forming the preferred molding compound a resin which does not degrade significantly during storage and cures during the heat and pressure of forming is necessary.

The ratio of continuous helically wound strand, swirled fibers and resin matrix may be adjusted to any combination which results in an acceptable moldable article. The amount of continuous strand in the finished article may suitably be between about 79 and about 20 percent by weight. A preferred amount of continuous strand in the finished article is between about 45 and about 60 percent by weight of the continuous strand for the strongest composite article. The amount of swirled fibers in the finished composite may suitably be between about 1 and 60 percent by weight. A preferred amount of swirled fibers is between about 20 and 40 percent by weight of the composite to give good strength transverse to the direction of continuous strand winding. The range of resin in the composite may be between about 50 and about 15 percent by weight. A preferred amount of resin is between about 20 and about 35 percent by weight of the finished composite for proper wetting and optimized physical properties.

The helix angle of winding on the mandrel may be selected to give the desired properties to the composite article and to minimize waste at the ends of the mandrel. Typically the helix angle may be as small as 45°, or as large as 89.9°. A suitable angle is between about 71° degrees and 89.89° degrees for a composite article with minimum waste. A preferred helix angle is between about 82.5° and about 87.5° for a very strong composite article with good molding characteristics. The optimum helix angle has been found to be about 85 degrees for optimum molding of complex shapes at optimum strength. An optimum composite has been found to be one comprised of about 50 percent by weight wound continuous strand, 25 percent by weight swirled fibers and 25 percent by weight resin matrix wound at a helical angle of about 85° degrees to give high strength in the direction of primary reinforcement and satisfactory strength transverse to primary reinforcement.

The method of continuous strand impregnation may be any method which results in a close control of the resin pickup of continuous wound strand such that uniform application and wetting of the continuous strand takes place. A preferred method is that illustrated in the drawing wherein the continuous strands for winding are passed through a resin bath and then drawn through close tolerance orifices. The preferred orifices are wire drawing dies. This method allows regulation of the resin content of the fiber to a plus or minus 2 percent of a desired resin to reinforcement weight and more typically plus or minus 1 percent of the desired amount of resin. The preferred glass strand from forming packages is drawn such that between 1 and 15 ends pass through each orifice. The preferred glass strand is K-37.5 from forming packages with passing five of these strands through each orifice of the bath. The strands may be coated by other methods if the necessary accuracy of resin coating can be maintained or if the particular product being formed does not require the uniform coating of the preferred materials of the invention. Typical of other methods of coating are passing through a bath followed by squeegee or roll removal of excess coating and spraying the coating onto the fibers. The viscosity of the resin is preferably between 400 and 1200 centipose for good pickup from the bath onto the forming package fibers. The helical winding may be continued to form any number of layers desired. Preferred are three complete plys of wound material. As this creates a composite that has high strength and molds to a thickness of about one eighth inch which is suitable for body parts of cars and trucks. For thicker parts several 3 ply sheets may be combined in the molding process.

The swirled fibers may be applied by any conventional device that is able to project it onto the mandrel in a stream narrow enough to be concentrated under the continuous strands as they are applied to the mandrel. The preferred fibers for swirl application are from K-37.5 forming packages. They maintain their strand integrity when swirled and most important they wet well with the resin carried by the continuous strands. The diameter of the swirls on the mandrel may be varied at the same glass content by using more strands at a slower application rate or fewer strands at faster application.

The winder for producing helical winding may be any commercial winder. A McClean-Anderson W-2 filament winder operated at about 500 feet per minute mandrel surface speed with a mandrel diameter of about 35 inches has been found to be suitable. However, other winders are commercially available and may be utilized. The winders incorporate various gear settings or electrical controls which may be regulated to produce the desired helix angles and desired laydown continuous patterns. Spacing between strands is controlled by the spacer bar mounted on the traversing carriage. The distance between the continuous strands is carefully regulated by the center spacing of the spacer bar eyelets. The formation of three layers is preferably carried out to produce a single ply sheet. By fine tuning of the helix angle it is preferred to precisely nest the continuous strands of the second and third layers into the continuous strand spacings of the first layer. This results in as thin as possible composite having no open diamonds and yet having many stress transfering crossovers. In order to achieve this desired nesting of the continuous strands it is necessary that the spacing between the ribbons be equal to the spacing between the continuous strands. The methods and apparatus for helical winding of continuous strands are known in the art and do not by themselves form a novel feature of the invention. However, the preferred method of the instant invention wherein the successive layers are wound such that the strands of the second layer are precisely nested between the strands of the first layer and the third layer strands are precisely nested between those of the second and first layers has not been practiced in the art and has been found to give maximum strength in the instant process. The nesting of strands results in the maximum number of crossovers between the strands. Such crossovers increase the strength of the article formed in the instant invention.

The following example illustrates a preferred embodiment of the invention. Parts and percentages are by weight unless otherwise indicated.

EXAMPLE I

A creel of 60 forming packages containing K-37.5 fiber glass continuous strand is arranged to be drawn such that 50 of the continuous strands are drawn through each of 12 orifices and into a bath for coating with a resin. The bath contains PPG 50335 heat curing isophthalic polyester resin. The continuous strands are withdrawn from the bath through close tolerance orifices selected such that they pick up an amount of resin corresponding to about 50% percent of the strand weight entering the bath. A group of 3 forming packages is arranged on a creel and drawn to a chopper gun that has been modified by removal of the chopper blades. The feed by the modified chopper is a rate that corresponds to half the weight of glass fiber drawn through the bath and is projected in swirls onto the mandrel. The close tolerance orifice diameter is about 0.037 inches and comprises a wire die. The winder is a McClean-Anderson W-2 winder rotating a mandrel about 31 inches in diameter at a peripheral speed of about 300 fpm. The mandrel is covered with a sheet of polyvinyl chloride plastic film to act as a release and a storage covering. The winder is programmed to produce a sheet of about 48 inches in width on the mandrel. The traversing mechanism of the winder is fitted with a spacer bar having a space on center between the continuous strands being applied to the mandrel of about 0.26 inches. This results in a spacing between the strands of about 0.16 inches. The winder is programmed to leave the spacing between the ribbons of about 0.16 inches. The resin bath temperature is maintained at between about 80° degrees and about 85° degrees F. The winder is operated at a helix angle of about 84.76° degrees. The spacer bar located on the traversing mechanism is mounted in such a position that the continuous strands go with little deviation from the spacer bar directly to the top of the mandrel. The modified chopping gun directs the swirled fibers to a point on the mandrel immediately to be covered by the continuous strands as they are wound on to the mandrel. They swirl in ringlets between about 0.5 and about 1.5 inches in diameter. A first layer of continuous strands are wound onto the mandrel then as the second layer starts the modified chopper gun is started to begin applying swirled fiber glass. The winder requires three layers to form one ply. After the formation of the eighth layer, the swirled strand is discontinued and the ninth layer which is the final layer of the third ply is applied without the chopper in operation. The three plys of composite are then covered with plastic film. The composite sheet is slit and removed from the mandrel. One foot square sections of the composite are molded at about 500 psi for 3 minutes. These samples are then tested and found to have the following properties in the direction perpendicular to the winding direction: tensile strength about 9 to 11 thousand psi, flex strength about 19 to 21 thousand psi and flex modulus about 1.1 to $1.3 \times 10^5$ the measurements in the direction parallel to the winding direction are tensile strength about 80,000 psi, flex strength about 135,000 psi and flex modulus about $5.75$–$6.0 \times 10^6$ psi. These strengths in the direction perpendicular to winding are very good. Additionally the composite has a good resistance to delamination upon impact. The overall composite comprises 50 parts wound strand, 25 parts swirled strand and 25 parts resin. The impact resistance is such that delamination does not occur when a sample is subjected to a Drop Dart Test. In the test a 10 lb. steel dart with 1" radius point is dropped from a height of 6 ft. The result is a slight dented surface at impact point and very light resin cracking on reverse side.

EXAMPLE II

Control

As a control, the process of Example I is repeated except that the swirled fiber is not utilized. The material without the swirled strand material fiber is found to have a tensile strength perpendicular to the winding of about 2,000 psi. This is only about 1/5 the strength that is gained in the instant invention by the use of the swirled fiber in combination with the helical winding.

EXAMPLE III

Control

As a control the process of Example I of the above-referenced Carley and Ackley copending application is repeated. A sample of the material is tested by the impact test of Example I and the impacted surface is dented and shows resin cracks. The reverse side of the impact is fractured and shows a degree of laminate delamination. This illustrates the unexpected impact resistance advantage of the instant material.

Although this invention has been described with reference to the particularly preferred embodiments those skilled in the art of reinforced plastics will recognize that variation may be made in the practice of this invention by departing from the concepts disclosed here. For instance, the composite formed by the method of the invention could utilize any combination of wound or swirled continuous glass strands and wound or swirled graphite or carbon strands. Further the process of the invention could be practiced with thermoplastic resins such as polypropylene to form low cost, low temperature but high strength products. In a further modification of the invention it is possible to change the process of the invention by modifying the number of winding layers under which swirled fibers are placed. It may be desirable in some instances to not place swirled strand under each layer except the surface layer as in the preferred embodiment. In some instances the surface properties may be improved by placing all the swirled strand in the middle five or six layers of wound continuous strand. Swirled pigmented strands on, at or near the surface could be utilized for improved visual effects. Accordingly, this disclosure is intended to be illustrative rather than limiting and the invention corresponds to the claims accompanying this disclosure.

I claim:

1. A method of forming a heat curable continuous glass fiber reinforced composite sheet suitable for molding into a shaped part comprising the steps of,
    (a) Passing a plurality of continuous glass strands through a liquid bath of heat curable resin to thoroughly wet said strands with resin,
    (b) Removing the resin wetted strands from said bath,
    (c) Passing each of said strands removed in (b) through a close tolerance orifice to remove excess resin and to provide on each strand a desired weight quantity of resin basis the weight of the strand,
    (d) Removing the strands from said orifices,
    (e) Passing each of the strands through an eyelet in a spacer bar to align the strands in a side by side relationship at precisely spaced distances from each other.
    (f) Winding the strands on a rotating mandrel at a helix angle of between 45 to 89.9 degrees while traversing the spacer bar across the long axis of said mandrel to thereby provide on the surface of said mandrel as it rotates a series of bands of resin coated continuous strands,
    (g) Continuing to wind strand in (f) until a layer of strand has been deposited on said mandrel,
    (h) When the layer of step (g) is provided introducing onto the surface of said mandrel a second group of continuous strands at a rate of speed higher than the peripheral speed of said rotating mandrel to thereby deposit said strands in a swirl pattern and at a point close to but below the point of contact of said helically wound strand to thereby trap said swirled strand under said resin coated strand and to wet said swirl strands with resin,
    (i) Continuing to wind said resin-coated strand and said swirled strands until the desired plies have been applied,
    (j) Discontinuing winding when step (i) has been completed and cutting and removing from the mandrel the resulting composite sheet.

2. The method of claim 1 wherein the helix angle in step (f) is between 71° and 89.9°.

3. The method of claim 1 wherein the helix angle in step (f) is between 82.5° and 87.5°.

4. The method of claim 1 wherein the helix angle in step (f) is 85°.

5. The method of claim 1 wherein the total continuous glass fiber reinforcement introduced in steps (f), (h), and (i) in forming the composite sheet is 25 to 79 percent by weight of the composite.

6. The method of claim 5 wherein said swirled strands comprise 20 to 40 percent by weight of said composite.

7. The method of claim 5 wherein said swirled strands comprise 25 percent, said wound strand 50 percent and said resin 25 percent of said composite by weight.

* * * * *